E. G. CARLSON.
IGNITING DEVICE.
APPLICATION FILED NOV. 28, 1911.
1,040,143.
Patented Oct. 1, 1912.
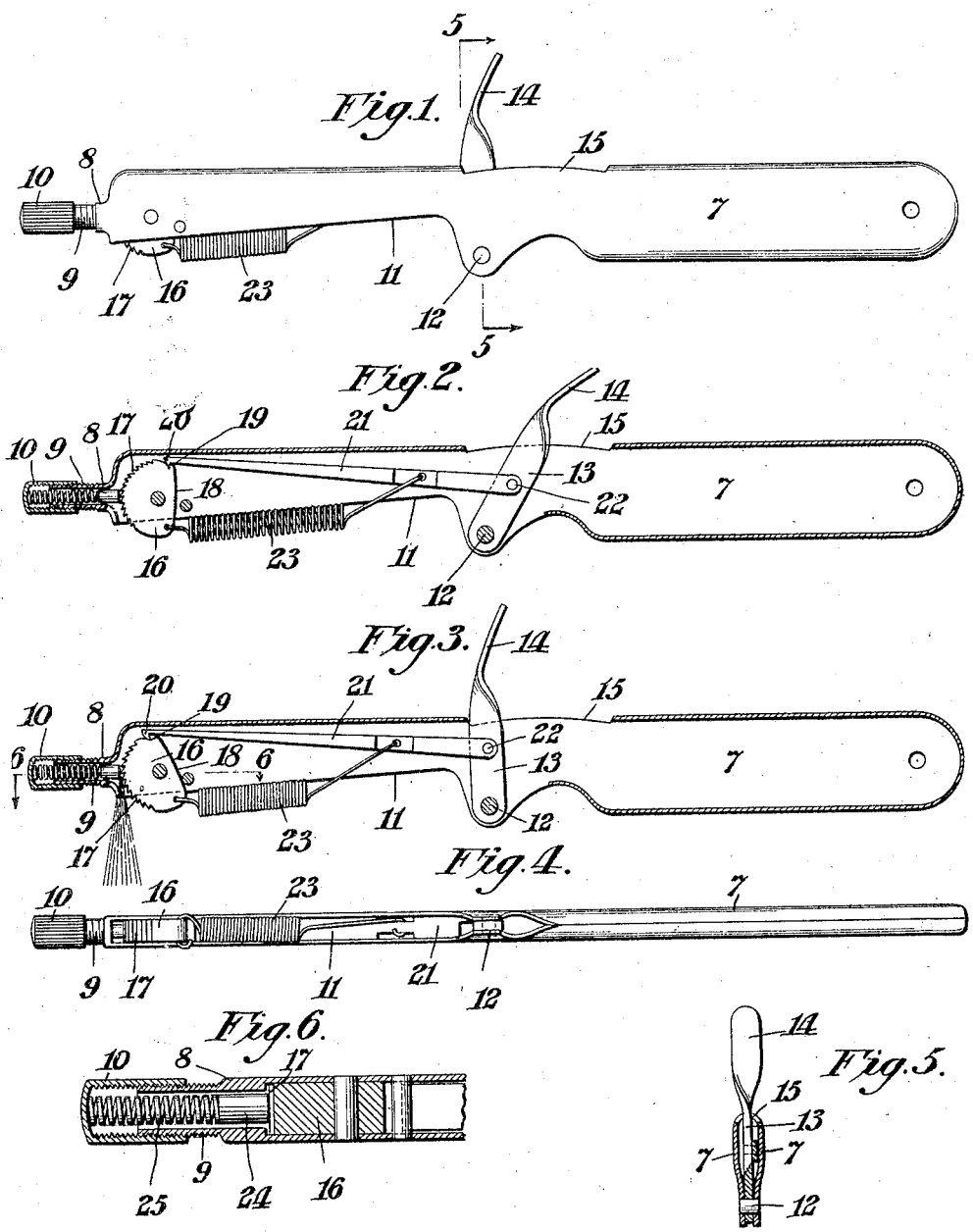
WITNESSES:
R. Schleicher
G. P. Sharkey
INVENTOR
Elis G. Carlson
BY
A. V. Trout
ATTORNEY.

UNITED STATES PATENT OFFICE.

ELIS G. CARLSON, OF TRENTON, NEW JERSEY, ASSIGNOR TO THE CARLSON-WENSTROM MANUFACTURING CO., INC., OF DOVER, DELAWARE, A CORPORATION OF DELAWARE.

IGNITING DEVICE.

1,040,143.     Specification of Letters Patent.     Patented Oct. 1, 1912.

Application filed November 28, 1911. Serial No. 663,654.

*To all whom it may concern:*

Be it known that I, ELIS G. CARLSON, a subject of the King of Sweden, residing at Trenton, in the county of Mercer and State of New Jersey, have invented certain new and useful Improvements in Igniting Devices, of which the following is a specification.

My invention has relation to that class of igniting devices for gas jets or the like wherein a spark or sparks are produced by striking small particles from one substance during its abrasion by another substance. Such devices operate upon the principle of the flint and steel inasmuch as the spark or sparks are produced by the removal from a material similar in its nature to flint, of minute particles which are heated to near incandescence by their sudden removal from the flint like substance when the steel like member abrades or rubs upon the point or pencil of the material.

The principal object of my present invention is to provide a simple and efficient ignition device which may be cheaply yet strongly constructed and which is so arranged that the ignitible or sparking material is fed to the steel abrading member and is readily removable from the device for replacement when desired.

The nature and scope of my invention will be more fully understood from the following description and claims taken in connection with the drawings.

In said drawings: Figure 1, is a side elevational view of an ignition device embodying main features of my invention. Fig. 2, is a longitudinal sectional view thereof, with the operating lever and parts partly retracted. Fig. 3, is a view similar to Fig. 2, but illustrating the normal position of parts after operation. Fig. 4, is an underneath plan view of the ignition device. Fig. 5, is a cross-sectional view taken on line 5—5 of Fig. 1, and Fig. 6, is a longitudinal sectional view, enlarged, taken on the line 6—6 of Fig. 3.

Referring to the drawings, 7 represents the handle for the device which, as shown, is preferably made of sheet metal stamped and bent into two substantially parallel and flat members between which the operating members of the device are inclosed. The handle 7 has at its forward end a tubular projection or nipple 8 which is screw-threaded as at 9 upon its exterior and upon this projection or nipple 8, a screw-threaded cap 10 is adapted to be advanced or retracted and can be entirely removed therefrom as occasion requires. The handle 7 has its forward portion cut away at the bottom as at 11 and has intermediate of its ends a bolt or rivet 12 forming the fulcrum for a lever arm 13 which traverses the handle 7 transversely and projects beyond the upper edge of the handle 7 in the form of a trigger 14. This trigger 14 works in a slot 15 cut longitudinally in the upper edge of the handle 7. At the forward end of the handle 7, adjacent to the nipple 8 and between the sides of the handle is pivoted a sector like disk 16 having ratchet teeth 17 on that portion of its periphery adjacent to the opening in the nipple 8 and having a plain cam surface 18 on the other or rear portion of its periphery. This cam surface 18 has a notch 19 arranged to receive the angular or tooth shaped end 20 of lever arm 21. The other end of the lever arm 21 is pivoted as at 22 to the lever arm 13 between its pivot or fulcrum 12 and its free or trigger end 14. A coiled spring 23 connects the lower end of disk 16 with the lever arm 21 at a point between its connection 22 with the lever arm 12 and its hooked end 20.

The operation of the parts of the device as hereinabove described is as follows: In normal or in operative position as illustrated in Figs. 1 and 3, the coiled spring 23 holds the trigger arm 12 in a substantially vertical or upright position and also turns the disk 16 so that its cam face 18 abuts at the base against the stop pin 24 and the toothed end 20 of the lever arm 21 engages the notch 19 of the disk 16. A movement backward of the trigger 14 serves first to turn the disk 16 on its pivot against the tension of spring 23 until the parts assume the position shown in Fig. 2. A further pull upon trigger 14 will then result in disconnecting the arm 21 from the notch of the disk 16 and said disk is then permitted to return to its normal position, the spring 23 causing the disk to turn rapidly and with considerable force. The disk 16 is made of steel or other hard material.

Referring now to Fig. 6 the construction and arrangement of the sparking material is as follows: Sliding in the nipple 8 is a pencil or rod 24 of sparking material, either flint or such substitutes as are well known in the art, and between the rear end of the pencil 24 and the interior of the cap 10 fitting on said nipple 8 is arranged the spring 25 adapted to force said pencil 24 inward toward and down upon the toothed periphery 17 of the disk 16. The cap 10 serves as a means for adjusting the pencil 24 toward the disk 16 and serves as a means, therefore, for taking up the wear upon the end of said pencil as it is abraded by the teeth of said disk 16. The spring 25 permits the pencil 24 to retract in the nipple 8 when the disk 16 is turned in one direction by the lever arm 21 and trigger 14 but forces the pencil firmly in the path of the ratchet teeth 17, when the disk 16 is rapidly turned by the spring 23.

Continuing now the operation of the device, as the toothed disk 16 is turned under the action of its spring 23, the ratchet teeth 17 on said disk strike rapidly upon the pencil 24 of sparking material and dig out or abrade from the face of said pencil 24 a succession of minute particles which readily incandesce by reason of their separation from the pencil under a succession of rapid blows. These sparks as shown by dotted lines, Fig. 3, are guided through the cut away portion 11 to the gas jet or similar object to be lighted. While the disk 16 is turning rapidly under the influence of its spring 23, said spring 23 also draws the lever arm 21 upward with its toothed end 20 riding upon the cam face of disk 16 until the toothed end 20 again rests in the notch on the periphery of said disk.

I claim:

1. In a device of the character described, a handle, a trigger pivoted to said handle and projecting therefrom, a striking member pivoted to said handle and having a series of teeth on one part thereof and a notch in another part thereof, a spring holding said member in a normal position, and an arm pivoted to said trigger and having a tooth adapted to engage said notch and move said member against the action of said spring and to release itself from said notch, in combination with a sparking member adjacent to and in contact with the toothed part of said striking member.

2. In a device of the character described, a handle, a trigger pivoted to said handle and projecting therefrom, a striking member pivoted to said handle and having a series of teeth on one part thereof and a notch in another part thereof, an arm connected to said trigger and having a tooth adapted to engage said notch when said member and said arm are in normal position, and a spring having one of its ends connected to said member and yieldingly holding it in its normal position and the other of its ends connected to said arm and yieldingly holding it in its normal position, in combination with a sparking member adjacent to and in contact with the toothed part of said striking member.

3. In a device of the character described, a handle, a trigger pivoted to said handle and projecting therefrom, a striking member pivoted to said handle and having a series of teeth on one part thereof and a notch in another part thereof, an arm connected to said trigger and having a tooth adapted to engage said notch when said member and said arm are in normal position, and a spring having one of its ends connected to said member and yieldingly holding it in its normal position and the other of its ends connected to said arm and yieldingly holding it in its normal position, said member having a cam surface leading to said notch and said spring drawing said arm toward said surface, in combination with a sparking member adjacent to and in contact with the toothed part of said striking member.

4. In a device of the character described, a handle, a trigger having its lower end pivoted to said handle, an arm having its rearward end pivoted to said trigger above the trigger pivot, said arm having a tooth on its forward end, a striking member pivoted to said handle below the forward end of said arm and having a notch in the upper portion thereof adapted to be engaged by said tooth, said member having a series of teeth on the forward face thereof, and a coiled spring having its forward end connected to said member below its pivot and its rearward end connected to said arm, in combination with a sparking member adjacent to and in contact with the toothed part of said striking member.

5. In a device of the character described, a handle, a trigger pivoted in said handle between its ends, a lever arm having a toothed end and pivoted to said trigger, a disk having on one portion of its periphery a series of ratchet teeth, and on the other portion of its periphery a notch and a cam surface, the toothed end of said lever arm adapted to ride upon the cam surface of the disk and to enter the notch and a coiled spring connecting the lower end of said disk with said lever arm, in combination with a sparking member carried in said handle adjacent to and in contact with the toothed periphery of the disk.

In testimony whereof I affix my signature in presence of two witnesses.

ELIS G. CARLSON.

Witnesses:
A. V. GROUPE,
S. I. HARPER.

Copies of this patent may be obtained for five cents each, by addressing the "Commissioner of Patents, Washington, D. C."